(12) United States Patent
Grasso et al.

(10) Patent No.: US 6,274,259 B1
(45) Date of Patent: Aug. 14, 2001

(54) FINE PORE ENTHALPY EXCHANGE BARRIER

(75) Inventors: Albert P. Grasso, Vernon; Ned E. Cipollini, Enfield, both of CT (US); Richard D. Breault, North Kingstown, RI (US)

(73) Assignee: International Fuel Cells LLC, South Windsor, CT (US)

( * ) Notice: Subject to any disclaimer, the term of this patent is extended or adjusted under 35 U.S.C. 154(b) by 0 days.

(21) Appl. No.: 09/395,704

(22) Filed: Sep. 14, 1999

(51) Int. Cl.$^7$ .................................................. H02M 8/04
(52) U.S. Cl. .................................. 429/13; 429/26; 429/34
(58) Field of Search ................................ 429/13, 22, 24, 429/25, 26, 34

(56) References Cited

U.S. PATENT DOCUMENTS

| | | | |
|---|---|---|---|
| 4,449,992 | * 5/1984 | Yamada et al. | 96/7 X |
| 4,876,162 | * 10/1989 | McElroy | 429/13 |
| 5,064,732 | * 11/1991 | Meyer | 429/13 |
| 5,503,944 | * 4/1996 | Meyer et al. | 429/13 |
| 5,573,866 | 11/1996 | Van Dine et al. | |
| 5,826,434 | * 10/1998 | Belding et al. | 62/90 |
| 5,840,414 | 11/1998 | Bett et al. | |
| 6,013,385 | * 1/2000 | DuBose | 429/26 X |

* cited by examiner

*Primary Examiner*—Stephen Kalafut
(74) *Attorney, Agent, or Firm*—Malcolm J. Chisholm, Jr.

(57) ABSTRACT

A fine pore enthalpy exchange barrier is disclosed for use with a fuel cell power plant. The barrier includes a support matrix that defines pores and a liquid transfer medium that fills the pores creating a gas barrier. An inlet surface of the fine pore enthalpy exchange barrier is positioned in contact with a process oxidant inlet stream entering a fuel cell power plant, and an opposed exhaust surface of the barrier is positioned in contact with an exhaust stream exiting the plant so that water and heat exchange from the exhaust stream directly into the process oxidant inlet stream to heat and humidify the stream as it enters the plant. The liquid transfer medium may include water, aqueous salt solutions, aqueous acid solutions, or organic antifreeze water solutions.

28 Claims, 2 Drawing Sheets

FINE PORE ENTHALPY EXCHANGE BARRIER

TECHNICAL FIELD

The present invention relates to fuel cell power plants that are suited for usage in transportation vehicles, portable power plants, or as stationary power plants, and the invention especially relates to a fine pore enthalpy exchange barrier for a fuel cell power plant that exchanges heat and water exiting the plant back into the plant to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles, or on-site generators for buildings. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEN") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

In operation of PEM fuel cells, it is critical that a proper water balance be maintained between a rate at which water is produced at the cathode electrode including water resulting from proton drag through the PEM electrolyte and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode, the PEM may dry out limiting ability of hydrogen ions to pass through the PEM, thus decreasing cell performance.

As fuel cells have been integrated into power plants developed to power transportation vehicles such as automobiles, trucks, buses, etc., maintaining a water balance within the power plant has become a greater challenge because of a variety of factors. For example, with a stationary fuel cell power plant, water lost from the plant may be replaced by water supplied to the plant from off-plant sources. With a transportation vehicle, however, to minimize fuel cell power plant weight and space requirements, the plant must be self-sufficient in water to be viable. Self-sufficiency in water means that enough water must be retained within the plant to offset water losses from gaseous streams of reactant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

An additional requirement for maintaining water self-sufficiency in fuel cell power plants is associated with components necessary to process hydrocarbon fuels, such as methane, natural gas, gasoline, methanol, diesel fuel, etc., into an appropriate reducing fluid that provides a hydrogen rich fluid to the anode electrode. Such fuel processing components of a fuel cell power plant typically include a boiler that generates steam; a steam duct into which the hydrocarbon fuel is injected; and an autothermal reformer that receives the steam and fuel mixture along with a small amount of a process oxidant such as air and transforms the mixture into a hydrogen-enriched reducing fluid appropriate for delivery to the anode electrode of the fuel cell. The fuel processing components or system water and energy requirements are part of an overall water balance and energy requirement of the fuel cell power plant. Water made into steam in the boiler must be replaced by water recovered from the plant such as by condensing heat exchangers in the cathode exhaust stream and associated piping.

A common approach to enhancing water recovery and retention is use of condensing heat exchangers in exhaust streams of the power plant wherein the exhaust streams are cooled to a temperature at or below their dew points to precipitate liquid water from the exhaust streams so that the liquid may be returned to the power plant. An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool a cathode exhaust stream, which upon leaving a cathode chamber includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced the water recovery and energy efficiency of fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air coolant stream passes through a heat exchanger, performance of the exchanger will vary as a direct function of the temperature of the ambient air because decreasing amounts of liquid precipitate out of power plant exhaust streams as the ambient air temperature increases.

An additional requirement of using such condensing heat exchangers in fuel cell power plants powering transportation vehicles is related to operation of the vehicles in temperatures below the freezing temperature of water. Because water from such exchangers is often re-introduced into the PEM fuel cells of the plant, the water may not be mixed with conventional antifreeze to lower its freezing temperature. Propylene glycol and similar antifreezes would be adsorbed by the catalysts in the cells decreasing cell efficiency, as is well known.

Accordingly, known fuel cell power plants that employ ambient air as the cathode oxidant and/or that use condensing heat exchangers are incapable of efficiently maintaining a self-sufficient water balance when operating at high ambient temperatures because of their above described characteristics. It is therefore highly desirable to produce a fuel cell power plant that can achieve a self-sufficient water balance without a condensing heat exchanger while minimizing plant operating energy requirements.

DISCLOSURE OF THE INVENTION

A fine pore enthalpy exchange barrier is disclosed for use with a fuel cell power plant. The barrier includes a support matrix that defines pores and a liquid transfer medium that fills the pores creating a gas barrier. An inlet surface of the fine pore enthalpy exchange barrier is positioned in contact with a process oxidant inlet stream entering a fuel cell power plant, and an opposed exhaust surface of the barrier is positioned in contact with an exhaust stream exiting the plant so that water and heat exchange from the exhaust stream directly into the process oxidant inlet stream. The support matrix defines pores having a pore-size range of about 0.1–100 microns; the matrix is hydrophilic so that it is capable of being wetted by the liquid transfer medium resulting in a bubble pressure that is greater than 0.2 pounds per square inch ("p.s.i.") ; and, the matrix is chemically stable in the presence of the liquid transfer medium.

Exemplary support matrixes include rigid, porous, graphite layers; rigid, porous, graphite-polymer layers; rigid, inorganic-fiber thermoset polymer layers; glass fiber layers; synthetic-fiber filter papers treated to be wettable; porous metal layers; perforated metal layers wherein such perforations may include particulate matter secured within the perforations defining an acceptable fine pore-size range; and a plurality of differing layers of those support matrixes. Preferably the support matrix has a high thermal conductivity. This helps transfer heat axially from the exhaust stream to the process oxidant inlet stream of ambient air to thereby minimize freezing of an oxidant inlet when operating at very low ambient temperatures. The liquid transfer medium may include water, aqueous salt solutions, aqueous acid solutions, and organic antifreeze water solutions, wherein the transfer medium is capable of sorbing a fluid substance consisting of polar molecules such as water from a fluid stream consisting of polar and non-polar molecules. The fine pore enthalpy exchange barrier may be disposed within a structure of a direct mass and heat transfer device in fluid communication with process oxidant inlet and plant exhaust streams so that the structure and barrier cooperate to restrict bulk mixing of the inlet and exhaust streams. The structure may define manifolds, passageways, and seals to direct the inlet and exhaust streams through the device and into contact with the opposed inlet and exhaust surfaces of the fine pore enthalpy exchange barrier.

In another embodiment, the fine pore enthalpy exchange barrier includes a support matrix having a multi-layer, dual pore-size configuration, wherein a central layer is surrounded by opposed exterior layers and the exterior layers define pores having a larger pore-size range than pores defined by the central layer; the central layer defines less than 25 per cent (hereafter "%") of the total void volume of the support matrix; and the matrix is filled to greater than 35% of its total void volume with a liquid transfer medium so that the central layer is saturated with the transfer medium. The central layer thereby provides a gas barrier between the inlet and opposed exhaust surfaces of the support matrix. In the event of changed operating conditions, the liquid transfer medium may therefore move between the central layer and the exterior layers without having to move out of the fine pore enthalpy exchange barrier into the inlet oxidant stream or exhaust stream. By using a transfer medium that is a mixture of a non-volatile compound and water at operating conditions of the mass and heat transfer device in that embodiment, heated water within the exhaust stream may transfer directly into the inlet stream without loss of the liquid transfer medium from the support matrix as operating conditions change.

An additional embodiment may include a transfer medium circulating loop, wherein the transfer medium is circulated through the support matrix, and replenished when necessary, to further support maintenance of a gas barrier by the liquid transfer medium within the support matrix so that the exhaust stream does not mix directly with the inlet stream.

In operation of a fuel cell power plant using a fine pore enthalpy exchange barrier, as heated water vapor generated within the fuel cell moves from the plant exhaust stream directly through the fine pore enthalpy exchange barrier to humidify the inlet stream, sensible and latent heat also exchange between the inlet and exhaust streams, cooling the exhaust stream and heating the inlet oxidant stream directly with heat from the water within the exhaust stream. Evaporation of the exchanging water at the inlet surface of the fine pore enthalpy exchange barrier into the oxidant inlet stream also results in cooling of the inlet surface of the barrier, thereby increasing a temperature differential between the inlet and exhaust surface. That in turn results in increased rates of heat and mass transfer from the exhaust stream into the inlet stream. A dry oxidant inlet stream, resulting for example from operation of the fuel cell power plant in a dry climate, will thus result in more rapid evaporation of water from the barrier into the oxidant inlet stream. Therefore the fine pore enthalpy exchange barrier automatically increases humidification and heating of the oxidant inlet stream as the stream becomes drier. Additionally, by using a low volatility liquid transfer medium such as a salt solution having a substantial freezing point depression or by use of an antifreeze water solution, the fine pore enthalpy exchange barrier facilitates efficient transfer of water and heat from the plant exhaust stream into the oxidant inlet stream at a wide range of temperatures, without need for pre-heating the mass and heat transfer device housing the barrier; and a also protects the enthalpy exchange device from mechanical damage due to freezing of water.

Accordingly, it is a general object of the present invention to provide a fine pore enthalpy exchange barrier for a fuel cell power plant that overcomes deficiencies of prior art fuel cell power plants.

It is a more specific object to provide a fine pore enthalpy exchange barrier for a fuel cell power plant that transfers heat and water vapor from a plant exhaust stream directly into a plant inlet stream.

It is yet another object to provide a fine pore enthalpy exchange barrier for a fuel cell power plant that enhances a water balance and decreases volume and weight of the plant without utilizing a condensing heat exchanger.

It is still a further object to provide a fine pore enthalpy exchange barrier for use within a mass and heat transfer device of a fuel cell power plant that provides a liquid barrier to gas movement between oxidant inlet and plant exhaust streams passing opposed inlet and exhaust surface of the barrier.

These and other objects and advantages of this invention will become more readily apparent when the following description is read in conjunction with the accompanying drawing.

DESCRIPTION OF THE PREFERRED EMBODIMENTS

Figure 1:
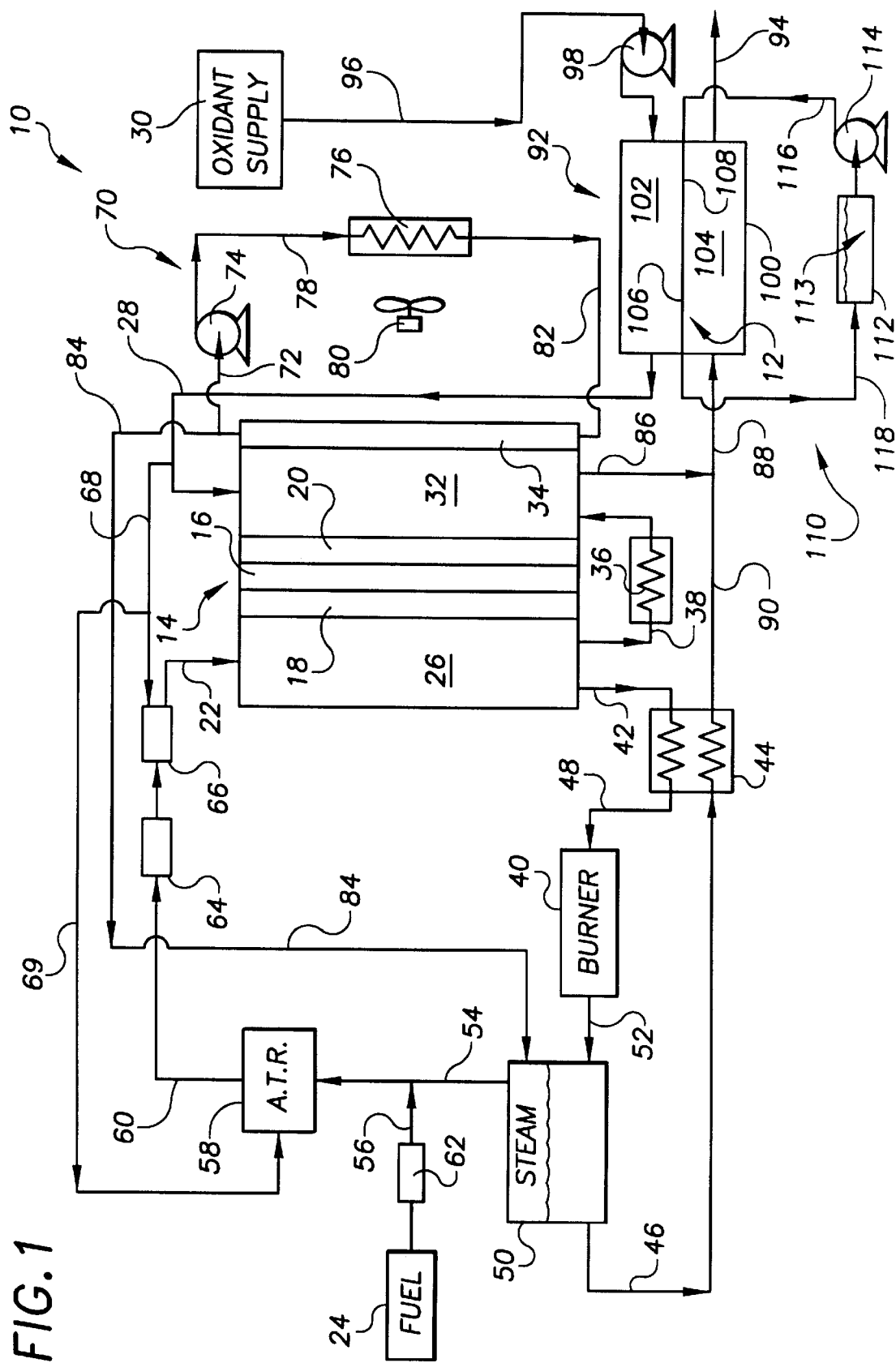
FIG. 1 is a schematic representation of a fuel cell power plant utilizing a fine pore enthalpy exchange barrier within a mass and heat transfer device of the plant.

Referring to the drawings in detail, a fuel cell power plant is shown schematically in FIG. 1 and generally designated by reference numeral 10 as an appropriate working environment for a fine pore enthalpy exchange barrier 12 of the present invention. The fuel cell power plant 10 includes at least one fuel cell means for producing electrical energy from a reducing fluid and an oxidant stream, such as fuel cell 14. The fuel cell 14 has an electrolyte 16 such as a proton exchange membrane ("PEM"), an anode electrode 18 and a cathode electrode 20 on opposed sides of the electrolyte 16. The fuel cell 14 may be combined with other virtually identical fuel cells (not shown) in a well-known manner to form a cell stack assembly enclosed within a frame (not shown) that defines manifolds for directing a reducing fluid stream and process oxidant stream into and out of the fuel cell 14 in a manner well-known in the art. A reducing fluid inlet 22 directs a hydrogen rich reducing fluid stored in a fuel supply 24 (labelled "FUEL" in FIG. 1 to facilitate understanding) into the cell 14 so that the reducing fluid passes through an anode flow field 26 defined adjacent the anode electrode 18. Similarly, an oxidant inlet line 28 directs an oxidant stream such as air from an oxidant supply 30 (labelled "OXIDANT" in FIGS. 1 and 2) into the cell 14 through oxidant manifolding (not shown, but well-known in the art) so that the oxidant passes through a cathode flow field 32 defined adjacent the cathode electrode 20.

The fuel cell 14 may also include a coolant plate means for removing heat from the fuel cell 12, wherein the coolant plate means may be a porous or sealed coolant plate 34 adjacent the cathode flow field 32. Whenever the coolant plate is described as sealed, it is meant that a coolant fluid in, or passing through the sealed coolant plate 34 cannot pass into the cathode flow field 32, or an anode flow field of an adjacent second fuel cell (not shown). By describing the coolant plate 34 as porous, in contrast, it is meant that a coolant fluid in, or passing through the coolant plate may pass into the cathode flow field 32 and/or anode flow field 26, and that water within the anode or cathode flow fields 26, 32 may move into the porous coolant plate 34. The anode and cathode flow fields 26, 32 may be cavities defined adjacent the anode and cathode electrodes 18, 20 by a frame, or they may consist of a plurality of small passages, channels, or pores defined within porous or channeled graphite, carbon or metal sheets, as is common in the art. The fuel cell 14 also includes common electrical conduction means for directing an electrical current generated by the fuel cell out of the cell 14 to an electricity using device 36, such as through a standard external load circuit 38.

The fuel cell power plant 10 also includes fuel processing component means for processing hydrocarbon fuels into reducing fluids appropriate for providing fuel to an anode electrode of a fuel cell. Exemplary hydrocarbon fuels for powering such a plant 10 include gasoline, diesel fuel, butane, propane, natural gas, methanol, ethanol, etc. The fuel processing component means may include: a burner 40 that may be a conventional or preferably a catalytic burner (labelled "BURNER" in FIG. 1 for convenience) that oxidizes any excess reducing fluid such as hydrogen fed to the burner 40 as an anode exhaust stream through an anode exhaust passage 42 in fluid communication with, and after passing through, the anode flow field 26; an anode exhaust heat exchanger 44 that receives the anode exhaust stream from the anode exhaust passage 42 and passes it in heat exchange relationship with an oxidized anode exhaust stream having passed through the burner 40 and passing within a third extension 46 of the anode exhaust passage 42, wherein the heated anode exhaust stream passes from the heat exchanger in a first extension 48 of the anode exhaust passage 42; a steam generator 50 (labelled "STEAM" in FIG. 1) that receives the oxidized anode exhaust stream from the burner 40 within a second extension 52 of the anode exhaust passage 42 and uses the heated, oxidized anode exhaust stream to generate steam, and wherein the oxidized anode exhaust stream leaves the steam generator 50 within the third extension 46 of the anode exhaust passage 42 to pass into the anode exhaust heat exchanger 44; a steam delivery line 54, that directs steam out of the steam generator 50; a fuel delivery line 56 that feeds the stored hydrocarbon fuel out of the fuel supply 24 and into the steam delivery line 54; a reformer 58 that may be an autothermal reformer (labelled "A.T.R." in FIG. 1) that receives the fuel and steam from the steam delivery line 56; and, a reformed fuel discharge line 60 that directs the reformed fuel from the reformer 58 into the reducing fluid inlet 22. In certain circumstances, the steam generator 50 is not necessary, and adequate water is supplied to the reformer 58 from the fuel cell means.

Any unused hydrogen in the anode exhaust stream is oxidized in the burner 40 to thereby heat the anode exhaust stream leaving the burner 40 within the second extension 52 of the anode exhaust passage 42 and to render the anode exhaust stream leaving the burner 40 non-flammable. The fuel processing component means may include components that are well-known in conventional steam reforming, autothermal reforming, and partial oxidation processing of various hydrocarbon fuels. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received to reach temperatures approximating 1,700 degrees fahrenheit (hereafter "° F"). Additional fuel processing component means may include a de-sulfizer 62 secured along the fuel delivery line 56 to remove any sulfur from the hydrocarbon fuel; a water shift reactor 64 and a selective oxidizer 66, which are secured in series in fluid communication with and along the reformed fuel discharge line 60 and that direct the reformed fuel into the reducing fluid inlet 22 in order to minimize carbon monoxide levels in the reducing fluid stream entering the anode flow field 26, as is well-known in the art. As shown in FIG. 1, the oxidant inlet line may include a first oxidant branch line 68 secured to the selective oxidizer 66 for directing a portion of the process oxidant stream into the selective oxidizer 66, and may also include a second oxidant branch line 69 for directing a portion of the process oxidant stream into the reformer 58.

The fuel cell 14 may include coolant means for cooling the cell during operation, and for supplying a coolant liquid to the cell and/or for removing product water from the cell, such as a coolant loop 70. The coolant loop 70 includes the coolant plate means 34 secured adjacent the cathode flow field 32 for passing a coolant fluid through the cell 14; a coolant exit line 72 that directs the coolant fluid from the coolant plate 34 to a coolant pump 74, which pumps the coolant fluid through the coolant loop 70; a coolant heat exchanger 76 that receives the coolant fluid from the coolant pump in a first extension 78 of the coolant exit line 72, and cools the coolant fluid by passage of a cooling fluid such as air forced through the coolant heat exchanger by a motorized fan 80, much like an automotive radiator; and, a coolant feed line 82 that directs the coolant fluid from the coolant heat exchanger 76 back into the coolant plate 34 within the fuel cell 14. In ordinary operation of the fuel cell 14 utilizing a porous coolant plate means 34, product water is generated at the cathode electrode, and may be removed from the cell within the coolant exit line 72. A water feed line 84 may be secured between the coolant exit line 72 and the fuel processing component means, such as the steam generator 50, as shown in FIG. 1, to supply additional water to the fuel processing components. Optionally, for example, the water feed line may direct the additional water directly to the burner 40 or reformer 58.

As shown in FIG. 1, the oxidant is supplied from the oxidant supply 30 to the cathode flow field 32 within the oxidant inlet line 28. After passing through the cathode flow field, the oxidant and product water formed at the cathode electrode in the form of water vapor and entrained liquid droplets all move out of the fuel cell 14 as a cathode exhaust stream within a cathode exhaust passage 86, and the cathode exhaust passage directs the cathode exhaust stream into a plant exhaust passage 88. Additionally, after passing through the anode exhaust heat exchanger 44, the oxidized anode exhaust stream passes into the plant exhaust passage 88 through a fourth extension 90 of the anode exhaust passage 42. The plant exhaust passage 88 directs the mixed cathode stream and anode exhaust stream as a plant exhaust stream into a direct mass and heat transfer device means for directly transferring mass from a first fluid stream passing through the device to a second fluid stream passing through the device, such as a direct mass and heat transfer device 92. The direct mass and heat transfer device 92 is secured in fluid communication with both the plant exhaust passage 88, and the oxidant inlet line 28. The plant exhaust passage 88 directs the plant exhaust stream into the mass and heat transfer device 92, and a plant exhaust vent 94 directs the plant exhaust stream out of the device 92 and out of the fuel cell power plant 10. A primary oxidant inlet 96 directs the oxidant from the oxidant supply 30 into the mass and heat transfer device 92, and the oxidant inlet line 28 directs the oxidant from the device 92 to cathode flow field 28 of the fuel cell 14. An oxidant blower 98 may also be positioned on the primary oxidant inlet 96 to variably accelerate flow of gaseous oxidant into the fuel cell 14, as shown in FIG. 1. Optionally, the oxidant blower 98 may be positioned along the oxidant inlet line 28 for the same purposes.

The mass and heat transfer device 92 includes a housing or structure 100 that defines an oxidant chamber 102 through which the process oxidant stream passes, and an exhaust chamber 104 through which the exhaust stream passes. The structure 100 also secures the fine pore enthalpy exchange barrier 12 in mass transfer relationship between the oxidant and exhaust chambers 102, 104 so that the process oxidant stream within the oxidant chamber 102 passes adjacent an inlet surface 106 of the barrier and the plant exhaust stream within the exhaust chamber 104 passes adjacent an exhaust surface 108, and the structure 100 secures the fine pore enthalpy exchange barrier 12 as a barrier between the inlet and exhaust streams (shown schematically in FIG. 1) to prevent bulk mixing of the streams. The mass and heat transfer device means may also include a liquid transfer medium supply means for supplying a liquid transfer medium to the fine pore enthalpy exchange barrier, such as a transfer medium circulating loop 110. The transfer medium loop 110 may include a transfer medium reservoir 112 holding a liquid transfer medium 113, a transfer medium pump 114 secured on a transfer medium feed line 116 in fluid communication between the reservoir 112 and the barrier 12, and a transfer medium return line 118 secured in fluid communication between the barrier 12 and the transfer medium reservoir 112. The liquid transfer medium supply means may also simply include the reservoir 112, feed line 116 and the pump 114 (or without the pump in a gravity supply means) in order to simply replace the liquid transfer medium 113, rather than to recirculate the medium. Preferably, the liquid transfer medium 113 may simply be trapped in the fine pore enthalpy exchange barrier 12, with no re-supply available or needed.

Figure 2:
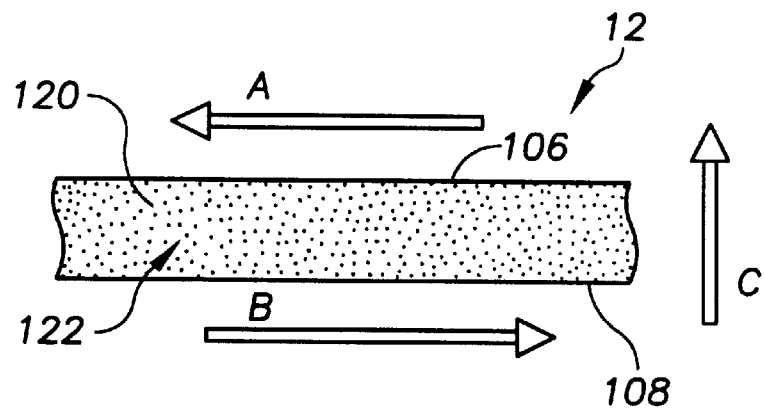
FIG. 2 is a fragmentary, cross-sectional representation of a first embodiment of a fine pore enthalpy exchange barrier for a fuel cell power plant.
Figure 3:
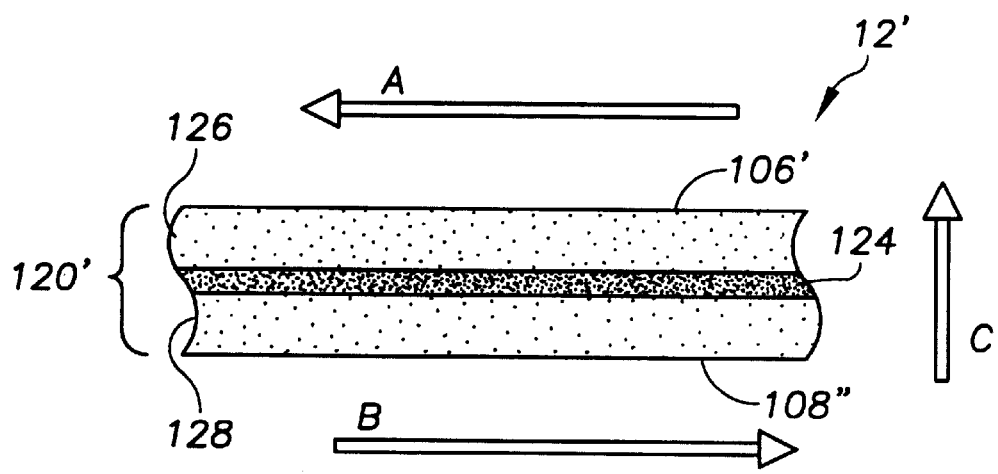
FIG. 3 is a fragmentary, cross-sectional representation of a second embodiment of a fine pore enthalpy exchange barrier for a fuel cell power plant.
Figure 4:
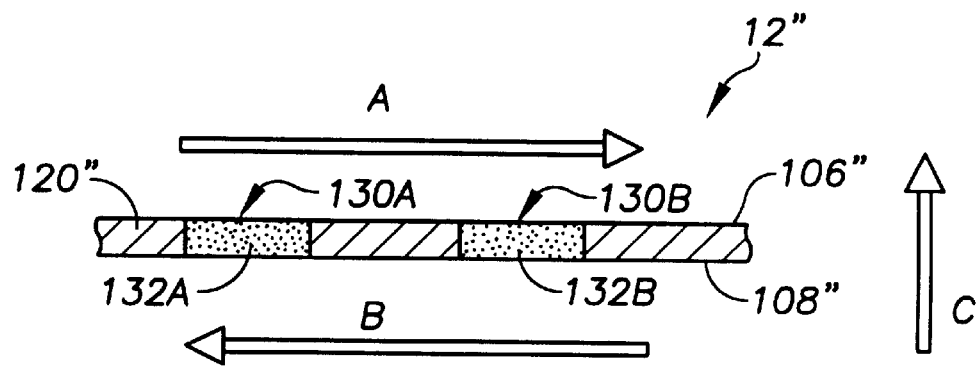
FIG. 4 is a fragmentary, cross-sectional representation of a third embodiment of a fine pore enthalpy exchange barrier for a fuel cell power plant.

The fine pore enthalpy exchange barrier 12 includes a support matrix means for defining hydrophilic pores having a pore-size range of between 0.1–100 microns that results in the barrier having a bubble pressure of greater than 0.2 pounds per square inch ("p.s.i.") when the hydrophilic pores are wetted by a liquid transfer medium, and for being chemically stable in the presence of the liquid transfer medium. The bubble pressure requirement of the support matrix is dictated by the specific design of the fuel cell 14 and the mass and heat transfer device 92 which set a maximum pressure differential between the exhaust stream within the exhaust passage 88 and the process oxidant stream within the oxidant inlet line 28. There is a trade-off between bubble pressure and liquid permeability, and the minimum bubble pressure necessary to allow maximum liquid permeability is utilized. FIG. 2 shows a first embodiment of the fine pore enthalpy exchange barrier 12 wherein a support matrix 120 is shown schematically defining a plurality of pores 122 between the inlet surface 106 and exhaust surface 108. To facilitate understanding in FIGS. 2–4, an arrow labelled "A" represents a possible direction of flow of the process oxidant inlet stream adjacent the inlet surface 106 (106' in FIG. 3, and 106" in FIG. 4); an arrow labelled "B" represents a possible direction of flow of the exhaust stream adjacent the exhaust surface 108 (108' in FIG. 3, and 108" in FIG. 4); and an arrow labelled "C" represents a direction of travel of water and heat from the exhaust surface 108, 108', 108" to the inlet surface 106, 106', 106" in the three embodiments shown in FIGS. 2–4. The arrows A, B, C in FIGS. 2–4 represent movement of heat and water adjacent and through the fine pore enthalpy exchange barrier 12 (12' in FIG. 3, and 12" in FIG. 4) when the fuel cell power plant is being operated so that product water formed at the cathode electrode 20 moves into the cathode exhaust stream, and water from the fuel processing component means within the oxidized anode exhaust stream pass as the plant exhaust stream into the exhaust chamber 104 of the mass and heat transfer device 92. Movement of the water and heat from the plant exhaust stream into the process oxidant inlet stream is driven by a difference in a partial pressure of the water molecules within the plant exhaust stream and a partial pressure of water molecules within the process oxidant inlet stream, and by a difference in temperatures between the two streams within the transfer device 92.

Exemplary support structure matrix means 120 (120' in FIG. 3, and 120" in FIG. 4) include porous graphite layers; porous, graphite-polymer layers; inorganic-fiber thermoset polymer layers; glass fiber layers; synthetic-fiber filter papers treated to be wettable; porous metal layers; perforated metal layers wherein such perforations include particulate matter secured within the perforations and defining an acceptable fine pore-size range; and a plurality of, differing layers of those support matrixes. The materials that may form support matrixes of this invention may be made hydrophilic by standard treatments well-known in the art with hydrophilic compounds, such as disclosed and described in U.S. Pat. No. 5,840,414, which Patent is owned by the assignee of all rights in the present invention and which Patent is incorporated herein by reference. Other materials capable of forming porous gas seals known in the art may also serve as a support matrix means, provided the materials can define hydrophilic pores having a pore-size range of between 0.1–100 microns that results in a gas barrier having a bubble pressure of greater than 0.2 p.s.i. when the hydrophilic pores are wetted by the liquid transfer medium, and the materials are chemically stable in the presence of the liquid transfer medium 113. The liquid transfer medium 113 may include water, aqueous salt solutions, aqueous acid solutions, and organic antifreeze-water solutions, wherein the transfer medium is capable of sorbing a fluid substance consisting of polar molecules such as water from a fluid stream consisting of polar and non-polar molecules. Preferred liquid transfer media include: a. a 20 to 35 weight per cent calcium chloride solution; b. a 25 to 35 weight per cent sulfuric acid solution; c. a 45 to 85 weight per cent ethylene glycol water solution; c. a 45 to 85 weight per cent propylene glycol solution; d. a 45 to 80 weight per cent glycerol water solution, so that the liquid transfer media have a freezing point less than 0 degrees fahrenheit (hereafter "° F"). Glycerol is especially preferred as the liquid transfer medium because it has both satisfactory freezing point depression and low vapor pressure characteristics at a working concentration. That results in low loss rates of the liquid transfer medium out of the fine pore enthalpy exchange barrier 12 during operation of the fuel cell power plant 10, and hence low amounts of the transfer medium in any plant emissions. Additionally, the quantity of antifreeze that is carried into the fuel cell with the process air is very low which mitigates poisoning of the cell.

By characterizing the support matrix 120 as chemically stable in the presence of the liquid transfer medium 113, it is meant that intimate, prolonged contact between the aforesaid concentrations of the varying liquid transfer media will not degrade the support matrix so that it cannot perform its role of supporting the liquid transfer to form a gas barrier between the inlet and exhaust surfaces 106, 108 of the fine pore enthalpy exchange barrier 12. By characterizing the support matrix 120 as having a pore-size range of between 0.1–100 microns that results in the barrier 12 having a bubble pressure of greater than 0.2 pounds per square inch ("p.s.i.") when the hydrophilic pores are wetted by the liquid transfer medium 113, it is meant that the pores defined by the support matrix have diameters that range from between about 0.1 to about 100 microns and that whenever the pores are wetted by the liquid transfer medium a pressure differential between the opposed inlet 106 and exhaust surfaces 108 of 0.2 p.s.i. or less will not result in gas movement through the fine pore enthalpy exchange barrier 12.

The first embodiment of the fine pore enthalpy exchange barrier 12 shown in fragmentary cross-section in FIG. 2 represents a single monolytic layer embodiment of the barrier 12, adequate to effect efficient transfer of water and heat from the exhaust stream to the process oxidant inlet stream. The fine pore enthalpy exchange barrier 12 may have an optimal thickness range, being a shortest distance between the inlet and exhaust surfaces 106, 108 of between about 0.001 to about 0.100 inches. Additionally, the structure 100 of the mass and heat transfer device 92 may be structured to include manifolds and passageways (not shown) to distribute the process oxidant inlet stream and plant exhaust stream through multiple inlet and exhaust chambers (not shown) adjacent a plurality of stacked fine pore enthalpy exchange barriers 12, as is common in heat exchanger art, in order to enhance the efficiency of the device 92 depending upon performance characteristics and water recovery requirements of the plant 10.

A second embodiment of the fine pore enthalpy exchange barrier 12' is shown in FIG. 3, wherein the support matrix means includes a multi-layer support matrix 120' having a dual pore-size configuration, comprising a central layer 124, a first exterior layer 126 between the central layer and the inlet surface 106', and a second exterior layer 128 between the central layer and the exhaust surface 108'. The central layer 124 defines pores having a pore-size range of between 0.1 to 20 microns and the exterior layers 126, 128 define a pore size range of between 10 to 50 microns. Additionally, the central layer 124 defines less than 25% of a total void volume of the multi-layer, dual pore size support matrix 120', and the multi-layer support matrix 120' is filled to greater than 35% of its total void volume with the liquid transfer medium 113 so that the pores defined within the central layer 124 are saturated to create a gas barrier between the inlet and exhaust surfaces 106', 108' of the multi-layer support matrix 120'. In use of the fine pore enthalpy exchange barrier 12' having the multi-layer support matrix 120', in the event of changed operating conditions of the fuel cell power plant 10, the liquid transfer medium may move into or out of the central layer 124 into either the first exterior layer 126, the second exterior layer 128, or both, and thereby minimize a possibility of the liquid transfer medium moving out of the fine pore enthalpy exchange barrier 12' into the process oxidant inlet or exhaust streams, and to also minimize a possibility of gas transferring across the barrier 12'. The central layer 124 and exterior layers 126, 128 of the multi-layer support matrix may be the same or dissimilar support matrix materials.

A third embodiment of the fine pore enthalpy exchange barrier 12" is shown in FIG. 4, wherein the support matrix means is a perforated metal, plastic or fiber reinforced plastic layer support matrix 120" defining a plurality of perforations 130A, 130B wherein a particulate matter 132A, 132B is secured within the perforations, such as by standard chemical bonding, well-known in the art. For convenience, the perforated metal, plastic or fiber reinforced plastic layer support matrix 120" will be referred to as a "perforated layer support matrix". The particulate matter defines hydrophilic pores between 0.1 to about 100 microns so that the pores result in a gas barrier when wetted with the liquid transfer medium exhibiting a gas bubble pressure of greater than 0.2 p.s.i. Because the plurality of perforations 130A, 130B and particulate matter 132A, 134B define pores passing through the perforated layer support matrix 120", polar molecules such as water in the exhaust stream passing adjacent the exhaust surface 108" of the support matrix 120" will pass through the support matrix 120" to the process oxidant inlet stream passing adjacent the inlet surface 106". Exemplary materials to form the perforated layer support matrix 120" include stainless steel, and other metals well-known as structural components in the heat exchanger art, as well as a fiberglass-epoxy composite. The inlet and exhaust surfaces 106", 108" of the perforated layer support matrix 120" may also be coated with a porous, wetted material, such as carbon black, silicon carbide, metals, oxides, hydroxides, silicates, or wettable polymers, in order to aid in condensation of water on the exhaust surface 108" and movement of the condensed water to the plurality of perforations 130A, 130B, and to aid in more rapid distribution and evaporation of water on the inlet surface 106".

It is pointed out that while potential alternative porous gas seal structures such as ionomer or polymer films could also transport water and heat, they are known to be quite expensive, and are not chemically stable in the presence of a wide variety of liquid transfer media necessary to facilitate efficient operation of fuel cell power plants in climates varying from sub-freezing to hot, dry ambient conditions, such as experienced by modern transportation vehicles.

In operation of the fuel cell power plant 10 using the fine pore enthalpy exchange barrier 12, water vapor generated within the fuel cell 14 passes from the plant exhaust stream through the barrier 12 to humidify the process oxidant inlet stream, and latent and sensible heat also exchange between the inlet and exhaust streams, cooling the exhaust stream by movement of the water vapor out of the stream, and heating the inlet stream directly with the water vapor. Evaporation of the exchanging water at the inlet surface 106 of the fine pore enthalpy exchange barrier 12 into the oxidant inlet stream also results in cooling of the inlet surface 106 which increases a temperature differential between inlet and exhaust surfaces 106, 108. That increased temperature differential results in an increased rate of heat and water transfer into the inlet stream. A rate of evaporation of the heated water into the inlet stream is also a function of humidity of ambient air, where ambient air is the oxidant for the plant 10. Consequently, as the fuel cell power plant 10 is operated in drier air, such as with a transportation vehicle moving into a dry climate, a rate of water movement from the exhaust to the inlet stream to humidify the inlet stream will automatically increase. Use of the support matrix 120 being chemically stable in the presence of a low volatility liquid transfer medium 113 having a substantial freezing point depression characteristic also enables the fuel cell power plant 10 to be operated through a wide temperature range without need for preheating the mass and heat transfer device 92, while minimizing chances of the liquid transfer medium 113 leaving the fine pore enthalpy exchange barrier 12.

While the present invention has been described and illustrated with respect to particular embodiments and methods of use of a fine pore enthalpy exchange barrier for a fuel cell power plant, it is to be understood that the present invention is not to be limited to the described and illustrated embodiments. For example, the anode exhaust heat exchanger 44 and coolant heat exchanger 76 have been shown schematically as separated from each other for ease of understanding. For purposes of efficiency however, those components may be stacked together to take advantage of common ducting, or for efficiency in fluid flow and heat exchange. Additionally, although the fine pore enthalpy exchange barrier 12 for a fuel cell power plant 10 of the present invention has been primarily described in the context of a "PEM" fuel cell, the barrier 12 is applicable to other fuel cells utilizing other solid polymer or aqueous electrolytes. Further, FIG. 1 shows schematically a direct mass and heat transfer device 92 securing one fine pore enthalpy exchange barrier 12 secured between process oxidant inlet and plant exhaust streams. The invention, however, also includes a plurality of the barriers 12 secured in a manner appropriate to efficiently transfer necessary water and heat from the exhaust to the inlet stream, depending upon operational requirements of the plant 10. Accordingly, reference should be made primarily to the following claims rather than the foregoing description to determine the scope of the invention.

What is claimed is:

1. A fuel cell power plant that generates electrical energy from a process oxidant stream and a reducing fluid stream, the plant comprising:

a. at least one fuel cell means for producing the electrical energy from the oxidant stream and reducing fluid stream; and, b. a direct mass and heat transfer device secured in fluid communication with both a primary oxidant inlet line that directs the process oxidant stream into the fuel cell means and also with a plant exhaust passage that directs a plant exhaust stream out of the fuel cell means, the device including a structure that secures a fine pore enthalpy exchange barrier in mass transfer relationship between the oxidant and exhaust streams passing through the device so that the process oxidant stream passes adjacent an inlet surface of the barrier, and the plant exhaust stream passes adjacent an opposed exhaust surface of the barrier and the structure secures the barrier between the oxidant and exhaust streams to prevent bulk mixing of the streams within the device, wherein the barrier includes a support matrix means for defining hydrophilic pores having a pore-size range of between about 0.1 to about 100 microns and for being chemically stable in the presence of a liquid transfer medium so that whenever the liquid transfer medium fills the pores the barrier has a bubble pressure greater than 0.2 pounds per square inch.

2. The fuel cell power plant of claim 1, wherein the liquid transfer medium is an aqueous salt solution having a freezing point of less than 0° F.

3. The fuel cell power plant of claim 1, wherein the liquid transfer medium is an aqueous acid solution having a freezing point of less than 0° F.

4. The fuel cell power plant of claim 1, wherein the liquid transfer medium is an organic antifreeze-water solution.

5. The fuel cell power plant of claim 1, wherein the liquid transfer medium is a 45 to 80 weight percent glycerol water solution.

6. The fuel cell power plant of claim 1, wherein the support matrix means comprises a support matrix selected from the group consisting of: a. a porous graphite layer; b. a porous graphite-polymer layer; c. an inorganic-fiber, thermoset polymer layer; d. a glass-fiber layer; e. a synthetic-fiber, filter-paper layer treated to be hydrophilic; f. a porous metal layer; and, g. a plurality of differing layers of this group.

7. The fuel cell power plant of claim 1, wherein the support matrix means comprises a multi-layer support matrix including a central layer and first and second exterior layers secured to opposed sides of the central layer, the central layer defining a pore-size range of 0.1 to 20 microns, the first and second exterior layers defining a pore-size range of 10 to 50 microns, the central layer defines less than 25 percent of a total void volume defined by the pores of the multi-layered support matrix, and the multi-layered support matrix is filled with the liquid transfer medium to greater than 35 percent of its total void volume so that the pores defined in the central layer are saturated.

8. The fuel cell power plant of claim 1, wherein the support matrix means comprises a perforated layer support matrix defining a plurality of perforations, having a particulate matter secured within the perforations so that the particulate matter defines pores having a pore-size range of between about 0.1 to about 100 microns and having a bubble pressure greater that 0.2 pounds per square inch whenever the pores within the perforations are wetted by the liquid transfer medium.

9. The fuel cell power plant of claim 8, wherein the perforated layer support matrix defines an inlet surface and an opposed exhaust surface and a surface of the perforated layer support matrix is coated with a porous wetted material selected from the group consisting of: a. carbon black; b. silicon carbide; c. metals; d. oxides; e. hydroxides; f. silicates; and, g. wettable polymers.

10. The fuel cell power plant of claim 1, further comprising a liquid transfer medium supply means for supplying the liquid transfer medium to the fine pore enthalpy exchange barrier.

11. The fuel cell power plant of claim 10, wherein the liquid transfer medium supply means includes a transfer medium reservoir for holding the liquid transfer medium, and a transfer medium feed line secured in fluid communication between the transfer medium reservoir and the enthalpy exchange barrier for directing the liquid transfer medium to flow between the reservoir and the enthalpy exchange barrier.

12. The fuel cell power plant of claim 11, wherein the liquid transfer medium supply means further comprises a transfer medium pump secured in fluid communication with the liquid transfer reservoir for pumping the liquid transfer medium from the reservoir into the enthalpy exchange barrier.

13. The fuel cell power plant of claim 12, wherein the liquid transfer medium supply means comprises a transfer medium circulating loop including a transfer medium return line secured between the enthalpy exchange barrier and the liquid transfer reservoir so that the liquid transfer medium may be pumped by the transfer medium pump to flow from the reservoir through the transfer medium feed line, through the enthalpy exchange barrier, and through the transfer medium return line back to the transfer medium reservoir.

14. A fuel cell power plant that generates electrical energy from a process oxidant stream and a reducing fluid stream, the plant comprising:
   a. at least one fuel cell means for producing the electrical energy from the oxidant stream and reducing fluid stream;
   b. fuel processing component means for processing a hydrocarbon fuel into the reducing fluid, including a burner and a reformer, wherein the burner receives an anode exhaust stream from the fuel cell means and directs an oxidized anode exhaust stream from the burner into a plant exhaust passage to mix with a cathode exhaust stream from the fuel cell means to become a plant exhaust stream; and,
   c. a direct mass and heat transfer device secured in fluid communication with both a primary oxidant inlet line that directs the process oxidant stream into the fuel cell means and also with the plant exhaust passage that directs the plant exhaust stream out of the fuel cell means, the device including a structure that secures a fine pore enthalpy exchange barrier in mass transfer relationship between the oxidant and exhaust streams passing through the device so that the process oxidant stream passes adjacent an inlet surface of the barrier, and the plant exhaust stream passes adjacent an opposed exhaust surface of the barrier and the structure secures the barrier between the oxidant and exhaust streams to prevent bulk mixing of the streams within the device, wherein the barrier includes a support matrix means for defining hydrophilic pores having a pore-size range of between about 0.1 to about 100 microns and for being chemically stable in the presence of a liquid transfer medium so that whenever the liquid transfer medium fills the pores the barrier has a bubble pressure greater than 0.2 pounds per square inch.

15. The fuel cell power plant of claim 14, wherein the liquid transfer medium selected from the group consisting of: a, an aqueous salt solution having a freezing point of less than 0° F.; b, an aqueous acid solution having a freezing point of less than 0° F.; and c. an organic antifreeze solution having a freezing point of less than 0° F.

16. The fuel cell power plant of claim 15, wherein the support matrix means comprises a support matrix selected from the group consisting of: a. a rigid, porous, graphite layer; b. a porous graphite-polymer layer; c. an inorganic-fiber, thermoset polymer layer; d. a glass-fiber layer; e. a synthetic-fiber, filter-paper layer treated to be hydrophilic; f. a porous metal layer; and, g. a plurality of differing layers of this group.

17. The fuel cell power plant of claim 15, wherein the support matrix means comprises a multi-layer support matrix including a central layer and first and second exterior layers secured to opposed sides of the central layer, the central layer defining a pore-size range of 0.1 to 20 microns, the first and second exterior layers defining a pore-size range of 10 to 50 microns, the central layer defines less than 25 percent of a total void volume defined by the pores of the multi-layered support matrix, and the multi-layered support matrix is filled with the liquid transfer medium to greater than 35 percent of its total void volume so that the pores defined in the central layer are saturated.

18. The fuel cell power plant of claim 15, wherein the support matrix means comprises a perforated layer support matrix defining a plurality of perforations, having a particulate matter secured within the perforations so that the particulate matter defines pores having a pore-size range of between about 0.1 to about 100 microns and having a bubble pressure greater that 0.2 pounds per square inch whenever the pores within the perforations are wetted by the liquid transfer medium.

19. The fuel cell power plant of claim 18, wherein the perforated layer support matrix defines an inlet surface and an opposed exhaust surface and a surface of the perforated layer support matrix is coated with a porous wetted material selected from the group consisting of: a. carbon black; b. silicon carbide; c. metals; d. oxides; e. hydroxides; f. silicates; and, g. wettable polymers.

20. The fuel cell power plant of claim 15, wherein the plant further comprises a coolant plate means for cooling the fuel cell means, including a water feed line in fluid communication between a coolant plate of the coolant means within the fuel cell means and the fuel processing component means, for supplying water generated by the fuel cell means to the fuel processing component means.

21. The fuel cell power plant of claim 14, further comprising a liquid transfer medium supply means for supplying the liquid transfer medium to the fine pore enthalpy exchange barrier.

22. The fuel cell power plant of claim 21, wherein the liquid transfer medium supply means includes a transfer medium reservoir for holding the liquid transfer medium, and a transfer medium feed line secured in fluid communication between the transfer medium reservoir and the enthalpy exchange barrier for directing the liquid transfer medium to flow between the reservoir and the enthalpy exchange barrier.

23. The fuel cell power plant of claim 22, wherein the liquid transfer medium supply means further comprises a transfer medium pump secured in fluid communication with the liquid transfer reservoir for pumping the liquid transfer medium from the reservoir into the enthalpy exchange barrier.

24. The fuel cell power plant of claim 23, wherein the liquid transfer medium supply means comprises a transfer medium circulating loop including a transfer medium return line secured between the enthalpy exchange barrier and the liquid transfer reservoir so that the liquid transfer medium may be pumped by the transfer medium pump to flow from the reservoir through the transfer medium feed line, through the enthalpy exchange barrier, and through the transfer medium return line back to the transfer medium reservoir.

25. A method of exchanging water and heat from a plant exhaust stream leaving a fuel cell power plant into a process oxidant stream entering a fuel cell of the fuel cell power plant, comprising the steps of:
   a. securing a fine pore enthalpy exchange barrier between an exhaust chamber and an oxidant chamber of a direct mass and heat transfer device, wherein a support matrix of the barrier defines hydrophilic pores having a pore-size range of between about 0.1 to about 100 microns, so that whenever a liquid transfer medium wets pores defined within a support matrix of the barrier, the barrier restricts bulk mixing of fluids between the exhaust and oxidant chambers;
   b. passing the plant exhaust stream through the exhaust chamber adjacent an exhaust surface of the fine pore enthalpy exchange barrier, and passing the process oxidant stream through the oxidant chamber adjacent an inlet surface of the barrier opposed to the exhaust surface so that a pressure differential between the exhaust and oxidant fluids is less than 0.2 pounds per square inch; and,
   c. then directing the process oxidant stream from the direct mass and heat transfer device into the fuel cell.

26. The method of claim 25, comprising the further steps of directing an anode exhaust stream from the fuel cell, through a burner of a fuel processing component means for processing hydrocarbon fuels into a reducing fluid for the fuel cell, directing an oxidized anode exhaust stream from the burner into the plant exhaust passage to mix with a cathode exhaust stream to become the plant exhaust stream.

27. The method of claim 25, comprising the further step of supplying the liquid transfer medium from a transfer medium reservoir through a transfer medium feed line to the enthalpy exchange barrier.

28. The method of claim 25, comprising the further step of pumping the liquid transfer medium through a transfer medium circulating loop so that the liquid transfer medium is directed to circulate from the transfer medium reservoir to the enthalpy exchange barrier and back to the transfer medium reservoir.

* * * * *